(12) United States Patent
Sen et al.

(10) Patent No.: US 8,874,056 B2
(45) Date of Patent: Oct. 28, 2014

(54) IDENTIFYING CHANNELS IN A COMMUNICATION NETWORK

(75) Inventors: Mitul Sen, San Jose, CA (US); Steven L. Christenson, Campbell, CA (US); Shreya G. Reddy, Fremont, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1325 days.

(21) Appl. No.: 12/198,689

(22) Filed: Aug. 26, 2008

(65) Prior Publication Data

US 2010/0056194 A1 Mar. 4, 2010

(51) Int. Cl.
*H04B 17/00* (2006.01)

(52) U.S. Cl.
CPC ........ *H04B 17/0065* (2013.01); *H04B 17/0077* (2013.01)
USPC ...................... 455/226.1; 455/67.7; 455/226.4

(58) Field of Classification Search
CPC ........................ H04B 17/0065; H04B 17/0077
USPC ................ 455/404.1–404.2, 518–521, 67.11, 455/67.7, 3.04, 226.1, 226.4, 154.1–156.1, 455/161.1, 179.1, 182.1
See application file for complete search history.

(56) References Cited

U.S. PATENT DOCUMENTS

| | | | | |
|---|---|---|---|---|
| 5,303,398 A * | 4/1994 | Tults | ........................... | 455/182.1 |
| 5,448,370 A * | 9/1995 | Kim et al. | ..................... | 386/234 |
| 5,524,273 A * | 6/1996 | Coley et al. | ...................... | 455/17 |
| 5,754,960 A * | 5/1998 | Downs et al. | ................. | 455/508 |
| 5,953,671 A * | 9/1999 | Childress | ....................... | 455/512 |
| 7,711,319 B2 * | 5/2010 | Namm et al. | ................. | 455/11.1 |
| 7,733,423 B2 * | 6/2010 | Ruckriem | ..................... | 348/563 |
| 7,831,270 B2 * | 11/2010 | Kalley et al. | .................. | 455/518 |
| 7,929,475 B2 * | 4/2011 | Simonson et al. | ............ | 370/312 |
| 8,085,671 B2 * | 12/2011 | Shaffer et al. | ................. | 370/237 |
| 8,098,639 B2 * | 1/2012 | McDonald et al. | ........... | 370/338 |
| 2004/0005904 A1 * | 1/2004 | Wolf et al. | ..................... | 455/519 |
| 2006/0014555 A1 * | 1/2006 | Paszkat | ......................... | 455/518 |
| 2006/0164562 A1 * | 7/2006 | Robertson | ..................... | 348/731 |
| 2007/0280195 A1 * | 12/2007 | Shaffer et al. | ................. | 370/351 |
| 2007/0287451 A1 * | 12/2007 | Seo et al. | ....................... | 455/434 |
| 2008/0076368 A1 * | 3/2008 | Arrasvuori | ................ | 455/186.1 |
| 2008/0299940 A1 * | 12/2008 | Shaffer et al. | ............. | 455/404.2 |
| 2009/0080378 A1 * | 3/2009 | Gupta et al. | .................. | 370/329 |
| 2009/0124193 A1 * | 5/2009 | Mitzel et al. | ................. | 455/3.01 |
| 2010/0048235 A1 * | 2/2010 | Dai et al. | ..................... | 455/518 |
| 2010/0165851 A1 * | 7/2010 | Li et al. | ......................... | 370/242 |
| 2010/0271561 A1 * | 10/2010 | Deng | ............................ | 348/738 |

* cited by examiner

*Primary Examiner* — Simon Nguyen (57) ABSTRACT

A method and apparatus to identify channels in a communications network are described. The method may comprise receiving communications on a plurality of communication channels including at least a first communication channel and a second communication channel. The method identifies when a channel change occurs from the first communication channel to the second communication channel. An audio identifier associated with the second communication channel is then included in an audio stream communicated via the second communication channel.

31 Claims, 7 Drawing Sheets

IDENTIFYING CHANNELS IN A COMMUNICATION NETWORK

FIELD

The present disclosure relates generally to communication systems. In an example embodiment, the disclosure relates to identifying channels using audible identifiers in a communication network.

BACKGROUND

In general, a communication system is a collection of communications networks, transmission systems, relay stations, tributary stations, and data terminal equipment usually capable of interconnection and interoperation to form an integrated whole. Communication devices may communicate with each other within the communication system on different communication channels.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Overview

A method and apparatus for identifying channels in a communications network are described. The method may comprise receiving communications on a plurality of communication channels including at least a first communication channel and a second communication channel. The method identifies when a channel change occurs from the first communication channel to the second communication channel. In response to the channel change, an audio identifier associated with the second communication channel is then included in a media stream communicated via the second communication channel.

Example Embodiments

Figure 1:
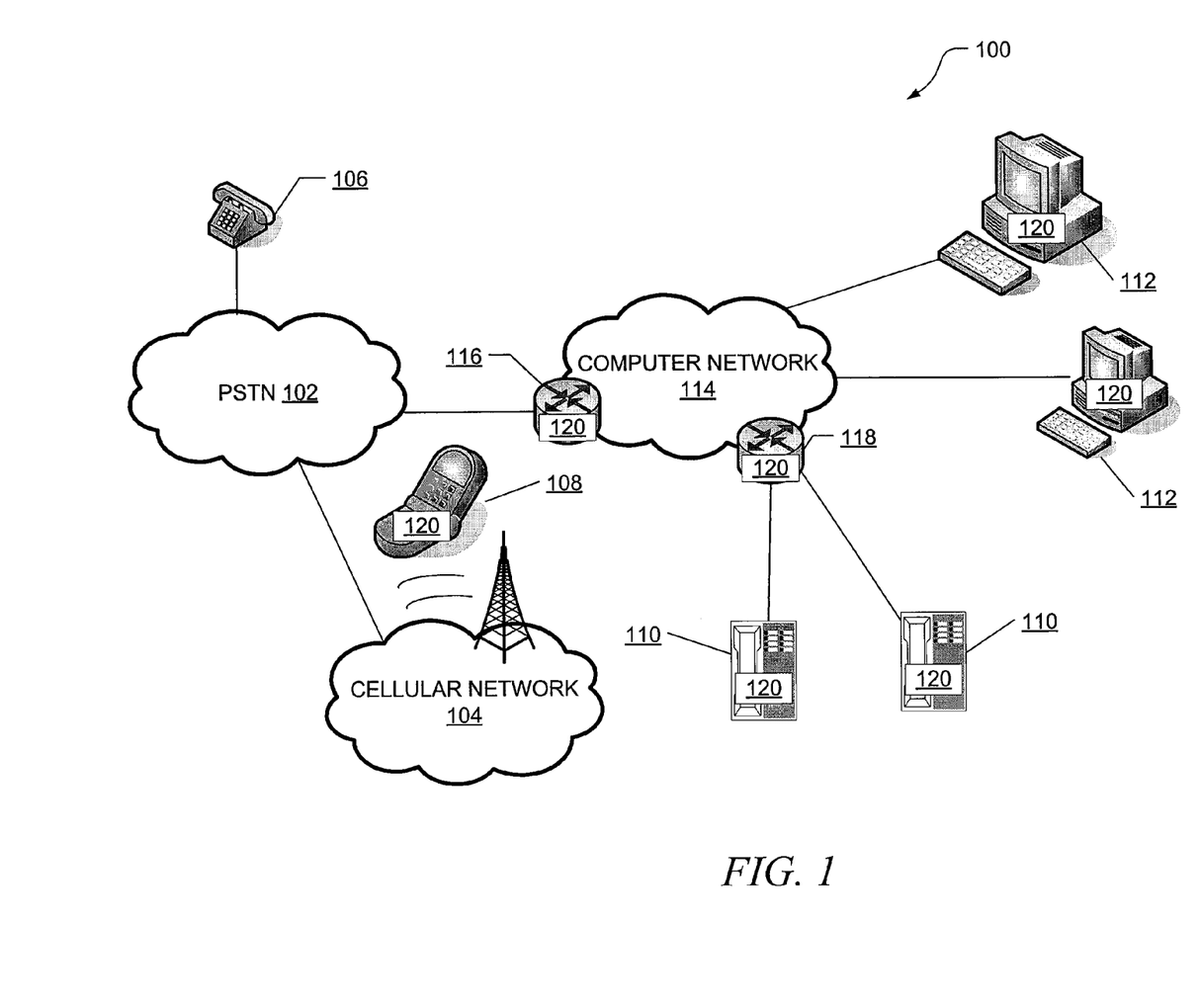
FIG. 1 depicts a simplified diagram of communication system, in accordance with an example embodiment.

FIG. 1 depicts a simplified diagram of a communication system 100, in accordance with an example embodiment. The communication system 100 is shown by way of example to include a public switched telephone network (PSTN) 102, a cellular network 104, and various networked computing devices, such as communication devices 106-112, in communication via a computer network 114. In general, the computer network 114 is a collection of interconnected computing devices, such as the communication devices 106-112, that communicate utilizing wired or wireless mediums. Examples of computer networks, such as the computer network 114, include Local Area Networks (LANs) and/or Wide Area Networks (WANs), such as the Internet. A communication device includes any equipment used in communication and associated with or attached to a communication network. Examples of communication devices include telephones 106, computers 112, Voice over Internet Protocol (VoIP) phones 110, mobile phones 108, gateways 116, routers 118, switches, transmission systems, relay systems, and other communication devices.

The PSTN 102 may include a Plain Old Telephone System (POTS). The PSTN 102 includes a collection of interconnected systems operated by telephone companies. The PSTN 102 may, for example, include the telephones 106, switches, and other systems and elements. The PSTN 102 may communicate with the computer network 114 via the gateway 116. The gateway 116 may provide voice interoperability between computer and non-computer networks, such as the PSTN 102, by bridging telephone transmissions to Internet Protocol (IP) multicast streams.

The PSTN 102 is also shown to communicate with the cellular network 104. The cellular network 104 includes a type of radio network with a full duplex system. Examples of the cellular network 104 include code division multiple access (CDMA), time division multiple access (TDMA), and other cellular networks. The mobile phones 108 may communicate via the cellular network 104.

As illustrated by way of example in FIG. 1, the communication devices 108, 110, 112, 116, and 118 may host a channel activity module 120. As explained in more detail below, the channel activity module 120 may be configured to include one or more audio identifiers in a media stream communicated between endpoint devices. The audio identifier may be any audible signal (e.g., an audible tone) that is audible to a person listening to the media stream at a communication device. In an example embodiment, audio identifiers may be assigned to indicate communication channel priority.

The priority may be assigned based on a variety of attributes or policies. In an example embodiment, a priority may be assigned to a user (e.g., assigned to a user account such as a computer record associated with the user). A high priority may be assigned to one account while a lower priority may be assigned to another account. In another example embodiment, a priority may be assigned to a role associated with the user account. The roles may correspond to, for example, organizational ranks, corporate hierarchies/governance, government grade levels, and other roles. In an example emergency services deployment, a high priority may be assigned to a coordinator or dispatcher while a low priority may be assigned to a member of a response team (e.g., paramedic, firefighter or the like). In still another example embodiment, a priority may be assigned to a particular communication device, such as a push-to-talk radio. As explained in more detail below, in an example embodiment the audio identifier may alert a listener when a communication channel is changed or when a command is sent via a communication channel.

Figure 2:
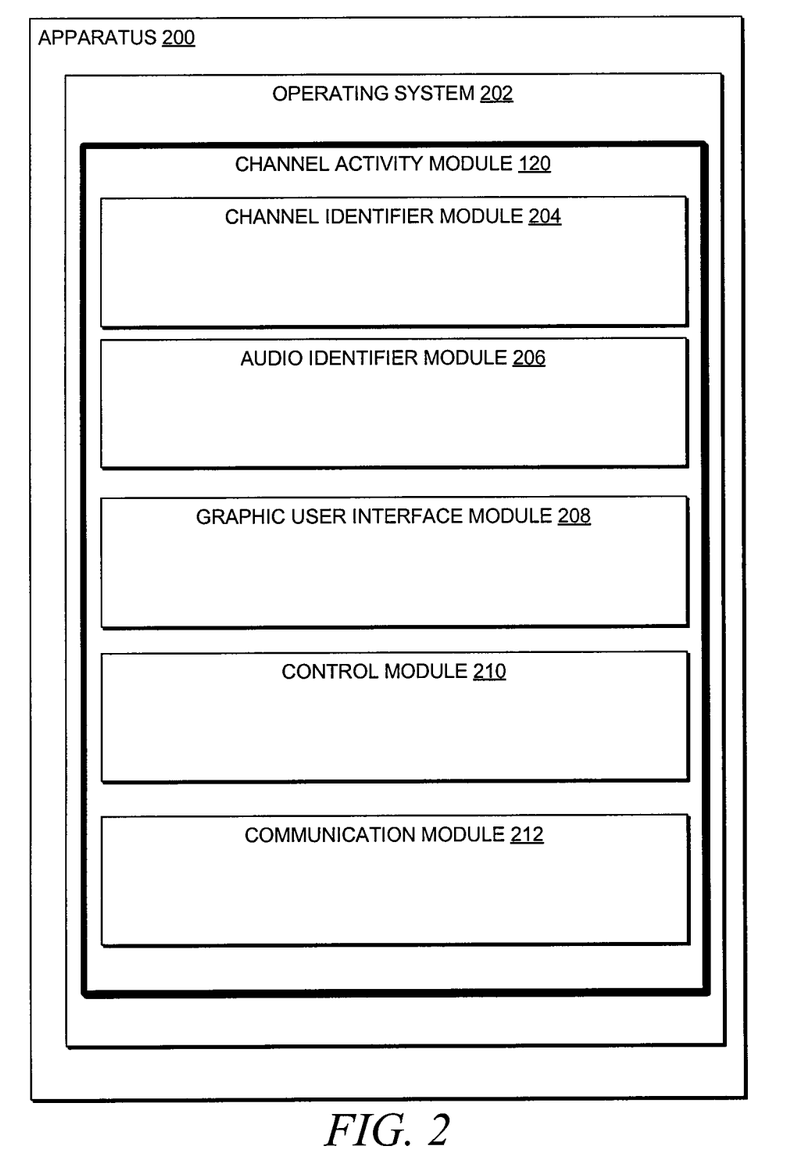
FIG. 2 depicts a simplified block diagram of an apparatus, in accordance with an example embodiment, including a channel activity module.

FIG. 2 depicts a simplified block diagram of an apparatus, in accordance with an example embodiment, to identify channels in a communication network. The apparatus 200 may be deployed in the communication network 100 and, accordingly, is described by way of example with reference thereto. The apparatus 200 is shown by way of example to include the channel activity module 120. One or more of the communication channels may carry a media stream which may, for example, be a multimedia stream (e.g., video and/or audio). In general, the media stream includes data (or flow of data) associated with audio and/or video. An example of a media stream is digitized audio data transmitted between VoIP phones. Another example of a media stream is data transmitted between computers in a video conference, where the data includes both digitized audio and video images. In still another example, a media stream is audio data transmitted between push-to-talk radios. The media stream may also be any combination of the above examples.

The apparatus 200 includes an operating system 202 (e.g., Cisco's Internetworking Operating System) that manages the software processes and/or services being executed on the apparatus 200. As shown in FIG. 2, these software processes and/or services may be provided in a channel activity module 120 that executes various operations to perform the methodology and functionality for identifying channels in a communication network.

The channel activity module 120 is shown by way of example to include a channel identifier module 204, an audio identifier module 206, a graphic user interface (GUI) module 208, a control module 210, and a communication module 212. It should be appreciated that apparatus 200 may be deployed in a variety of communication devices. For example, apparatus 200 may form a part of one or more of the communication devices depicted in FIG. 1, such as the computers 112, the VoIP phones 110 and/or the gateways 116 and 118. In various example embodiments, the apparatus 200 may be used to implement computer programs, logic, applications, methods, processes, or other software to identify channels in a communication network.

It should be appreciated that in other example embodiments, the channel activity module 120 may include fewer or more modules apart from those shown in FIG. 2. For example, one or more of the modules may be combined or a single module may be split into one or more separate modules.

Further, in an example embodiment, the computer network 114 may form part of a Cisco® IP Interoperability and Collaboration System (Cisco IPICS) network. The IPICS network may include communication devices that communicate using different modalities. For example, in an embodiment, the IPICS may network a plurality of push-to-talk endpoints with a push to talk management center which may be provided anywhere on the network. The Cisco IPICS portfolio of products and applications may allow organizations to rapidly respond to incidents or emergencies. Disparate Land Mobile Radio systems and devices such as mobile phones, landline phones, IP phones, and PC clients-users can communicate with whatever device they have, from wherever they are. Users can be paged or emailed with the status of an event, and can be automatically called and invited to join a virtual conference.

The channel activity module 120 may be provided at a Cisco IPICS Server Administration Console. The channel activity module may be configured to provide a Web-enabled, easy-to-use interface for orchestrating communications across devices, technologies and locations. A dispatcher can combine resources, including users and channels, to create Virtual Talk Groups (VTGs) and can add or remove resources depending on incident status. For example, a VTG can combine an 800 MHz Project 25 digital radio channel with a VHF analog radio channel, several PC-based Cisco IPICS PMC users, and several Cisco IPICS IP phone users. When the Cisco IPICS Policy Engine is used, telephone participants can also be included in the VTG, and the dispatcher can send notifications and automatically call and invite VTG participants on an as-needed basis.

A push to talk management center may monitor a large number of communication streams (e.g., up to 50 media streams) each associated with a dedicated communication channel associated with a VTG. These communication channels may, for example, have various different priorities assigned to them. For example, an emergency channel may have a higher priority assigned than a mundane channel. In an example embodiment, the media stream may be encapsulated in real-time transport protocol (RTP). In general, the RTP may define a standardized packet format for delivering audio and video over the Internet.

Figure 3:
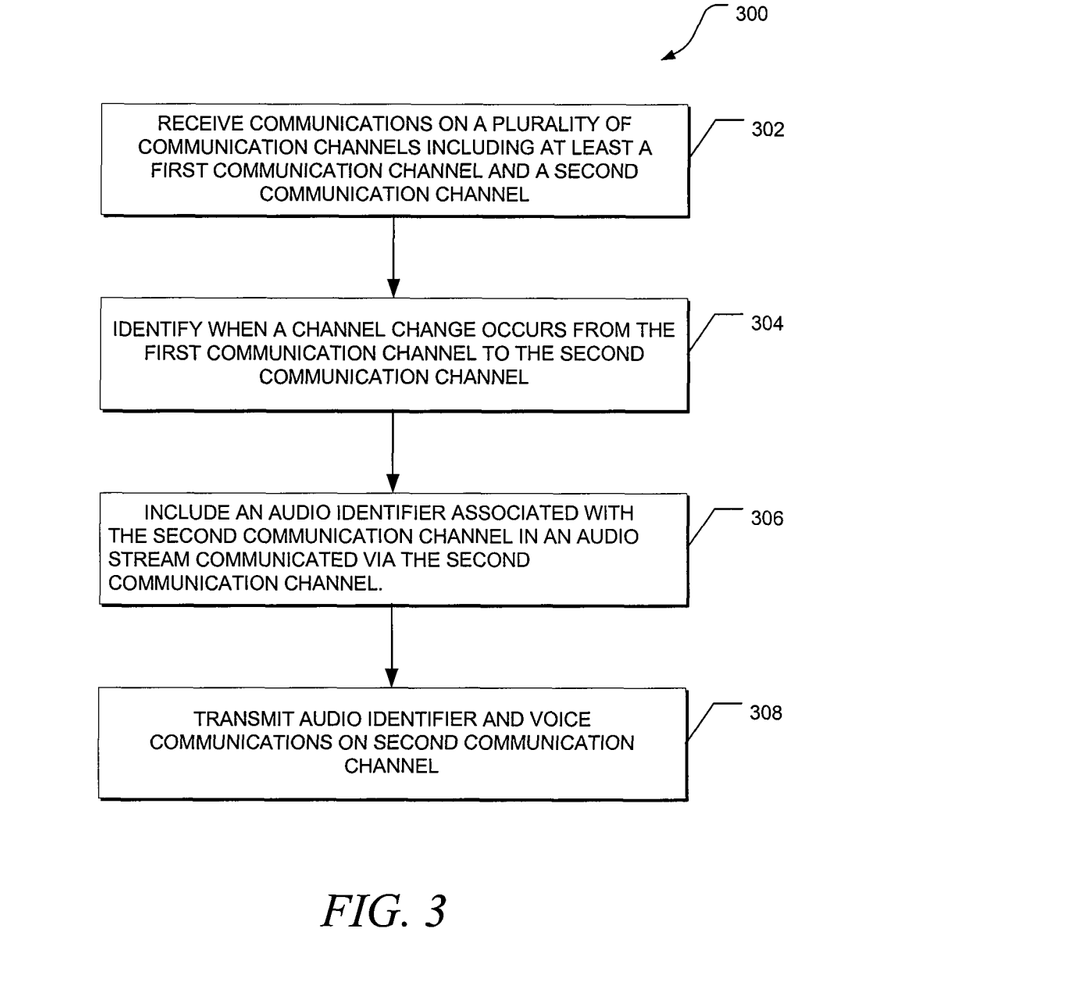
FIG. 3 depicts a flow diagram of a general overview of a method, in accordance with an example embodiment, for identifying channels in a communication network based on audio identifiers.

FIG. 3 depicts a flow diagram of a general overview of a method, in accordance with an example embodiment, for identifying channels in a communication network based on audio identifiers. The method 300 may be performed by the apparatus 200 and, accordingly, is described by way of example with reference thereto. The method 300 may be implemented by the channel activity module 120.

In the method at 300, as shown at block 302, the apparatus 200 may receive communications on a plurality of communication channels including at least a first communication and a second communication channel. For example, the communication module 212 may be connected to the computer network 114, which is configured to allow communication between a plurality of different communication devices, for example, the communication devices 108-112.

In an example embodiment, the channel identifier module 204 is configured to identify when a channel change occurs from the first communication channel to the second communication channel. It will be appreciated that the change in channel may occur (see block 304) from any one of the plurality of communication channels to another communication channel of the plurality of communication channels. Thereafter, the method 300 includes an audio identifier associated with a second communication channel in an audio stream communicated by the second communication channel (see block 306).

Thereafter, as shown at block 308, the audio identifier and media communications are communicated or transmitted on the second communication channel. Thus, in an example embodiment, a unique audio identifier is communicated in the communication channel that has been switched to so that a listener is aware of the channel change and able to identify which channel has been switched to based on the audio identifier.

The audio identifier may be any tone or other audible signal that allows a listener to identify that a channel change has occurred in the communication system. For example, a user may work in an emergency dispatch center and need to monitor 10 distinct communication channels. Any transmissions in the user's "emergency" channel may take precedence over other channels. Thus, although the user may be passively monitoring multiple transmissions on different communication channels, only a particular channel or few channels may be specifically of interest to him. In these circumstances, the user may be performing other tasks (e.g. paperwork) when the active communication channel is not a communication channel that is relevant to the user. The audio identifier (or multiple audio identifiers) may then alert the user to communications in the particular channel or few channels may be specifically of interest to the user.

For example, two sequential transmissions may be communicated via the communication system which the user/listener may then hear. For example, one transmission may be a call for help while the other transmission may be a routine announcement. In certain circumstances, the user may not be aware of which particular channel the call for help came from, which particular channel the call for help was communicated to, and/or on which particular channel the routine announcement was communicated. However, using the method 300, a unique audio identifier associated with, for example, the emergency channel may be transmitted on the channel when the particular emergency channel is active.

Accordingly, the listener can identify which particular channel is of relevance to him and act accordingly. Thus, in an example embodiment, the listener or user need not monitor a console to identify which particular channels are active, but may identify the active channel from an audible indicator that is communicated on the communication channel. The audio identifier may identify when activity occurs on a particular channel as well as when a change occurs from one channel to another channel.

In an example embodiment, the audio identifier is unique to a single specific channel. However, in addition or instead, an audio identifier may be associated with a group of channels. Thus, when a channel change occurs to any one of the channels in the group of channels, a single audio identifier may be transmitted thus identifying that a change has taken place to a channel in the group of channels. Thus, in an example embodiment, the method 300 may comprise associating the audio identifier with one of the groups of channels to identify when any channel in the group of channels is active. In an example embodiment, multiple Push-to-talk management centers (PMC) are associated with a base station of a trunk radio. Each one of the PMC users may use a channel selector to alter the channel on which the PMCs would transmit and/or receive. To ensure that all the PMC users are aware of the change in the frequency of the base station, the system may transmit a unique audio identifier to alert all the PMC users about the change of the frequency of the base station.

Figure 4:
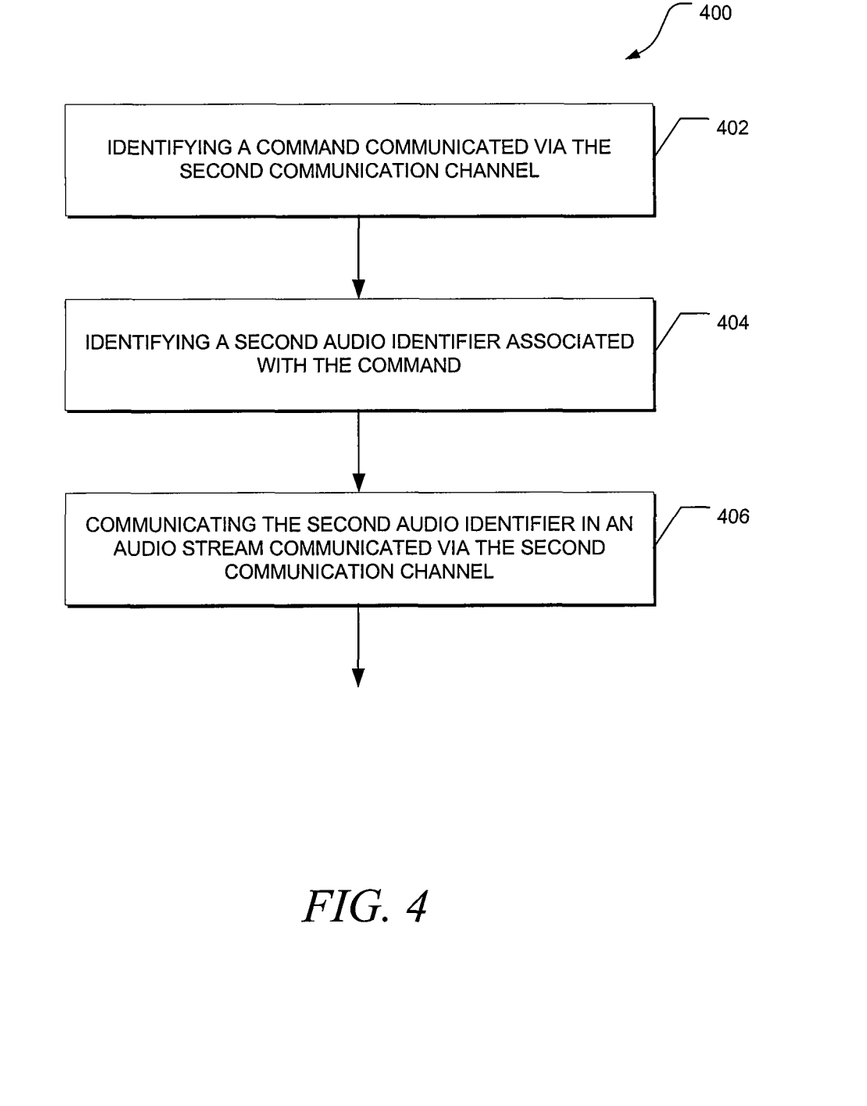
FIG. 4 depicts a flow diagram of a general overview of a method, in accordance with an example embodiment, for identifying commands communicated via a communication channel in a communication network.

Referring to FIG. 4, reference 400 generally indicates a method, in accordance with an example embodiment, for identifying commands communicated via a communication channel in a communication network. The method 400 may be deployed in the communication system 100 and, accordingly, is described by way of example with reference thereto. Further, the method 400 may be performed by the apparatus 200 and, accordingly, is also described with reference thereto.

As shown at block 402, the method 400 includes identifying a command communicated by the second communication channel and identifying a second audio identifier associated with the command (see block 404). Thus, a first audio identifier may be provided to identify a channel and the second audio identifier may identify one of a plurality of commands communicated via the communication channel. For example, the command may be a signal to open a gate, a signal to control one or more electrical or electronic devices, or the like.

Examples of such electrical or electronic devices include, but are not limited to, HVAC systems, lighting installations, sirens, video cameras, or the like.

Thereafter, as shown as block 406, the second audio identifier is communicated in an audio stream communicated via the second communication channel. Thus, a listener may identify without any visual indicator that a command has been transmitted or communicated via the second communication channel.

The audio identifier may be communicated prior to a communication (e.g. a voice communication) via the communication channel. For example, the apparatus 200 may buffer voice communications on the second communication channel, transmit the audio identifier, and thereafter play out the voice communication from the buffer. However, in an example embodiment, the audio identifier may be mixed with a voice transmission and played out simultaneously. The audio indicator may be a beep, blip, click, bonk, or any audible signal that a listener is capable of hearing. In another example embodiment, the audible indicator may speak the nature of the command, e.g., "open gate".

In an example embodiment, the audio identifier may be stored in a file (e.g. a .wav or .mp3 file) stored on the apparatus 200. Thus, as shown in the method of FIG. 4, more than one audio identifier may be associated with a communication channel. For example, a first audio identifier may uniquely identify a communication channel, and a second audio identifier may identify a command provided via the communication channel. Subsequent audio identifiers may be provided to identify other activities or changes that may occur in the communication channel. In an example embodiment, the audio identifier may be a recorded voice and thus be a spoken identifier.

It should be noted that the methods 300 and 400 may be deployed at any node within any computer network 114, the PSTN 102, the cellular network 104 and the radio network 601 (see FIGS. 1 and 6) and/or on the communication devices 108-112.

Figure 5:
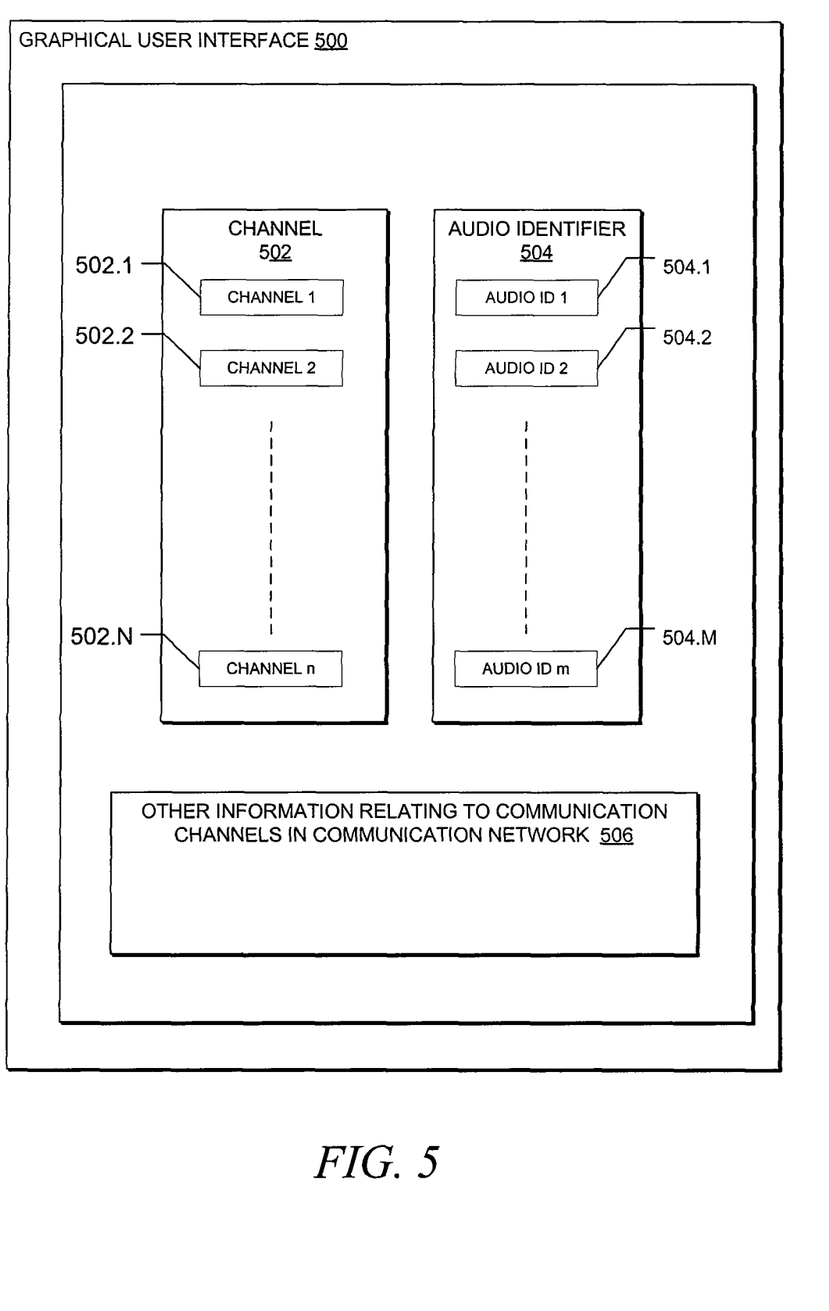
FIG. 5 depicts a schematic view of a graphical user interface, in accordance with an example embodiment, for associating audio identifiers with communication channels.

Referring in particular to FIG. 5, reference 500 generally indicates a graphical user interface (GUI), in accordance with an example embodiment, for associating one or more audio identifiers with one or more communication channels.

The GUI 500 may be provided on a display screen at a control console or a push to talk management center (PMC), such as that available from Cisco Technologies, Inc. of San Jose, Calif. In an example embodiment, the GUI 500 is provided at Cisco IPICS Server Administration Console. The GUI 500 includes a channel zone 502, and an audio identifier zone 504. The channel zone 502 identifies a plurality of communication channels 502.1-502.*n* of a communication system (e.g., the communication system 100 of FIG. 1). Likewise, the audio identifier zone 504 includes a plurality of audio identifiers 504.1-504.*m*. A display zone 506 is provided for displaying other information relating to the communication channels in the communication network. Using the channel zone 502 and the audio identifier zone 504, a user may associate a particular audio identifier with a communication channel. For example, an administrator may, using the GUI 500, associate a first channel 502.1 with a first audio identifier 504.1. In an example embodiment, the audio identifier zone 504 may include a plurality of drop down menus that allow a user to select a particular audio identifier and associate the selected audio identifier with a communication channel. It should be appreciated that the GUI 500 may also provide other icons, data entry fields etc. that are associated with the communication channels.

Figure 6:
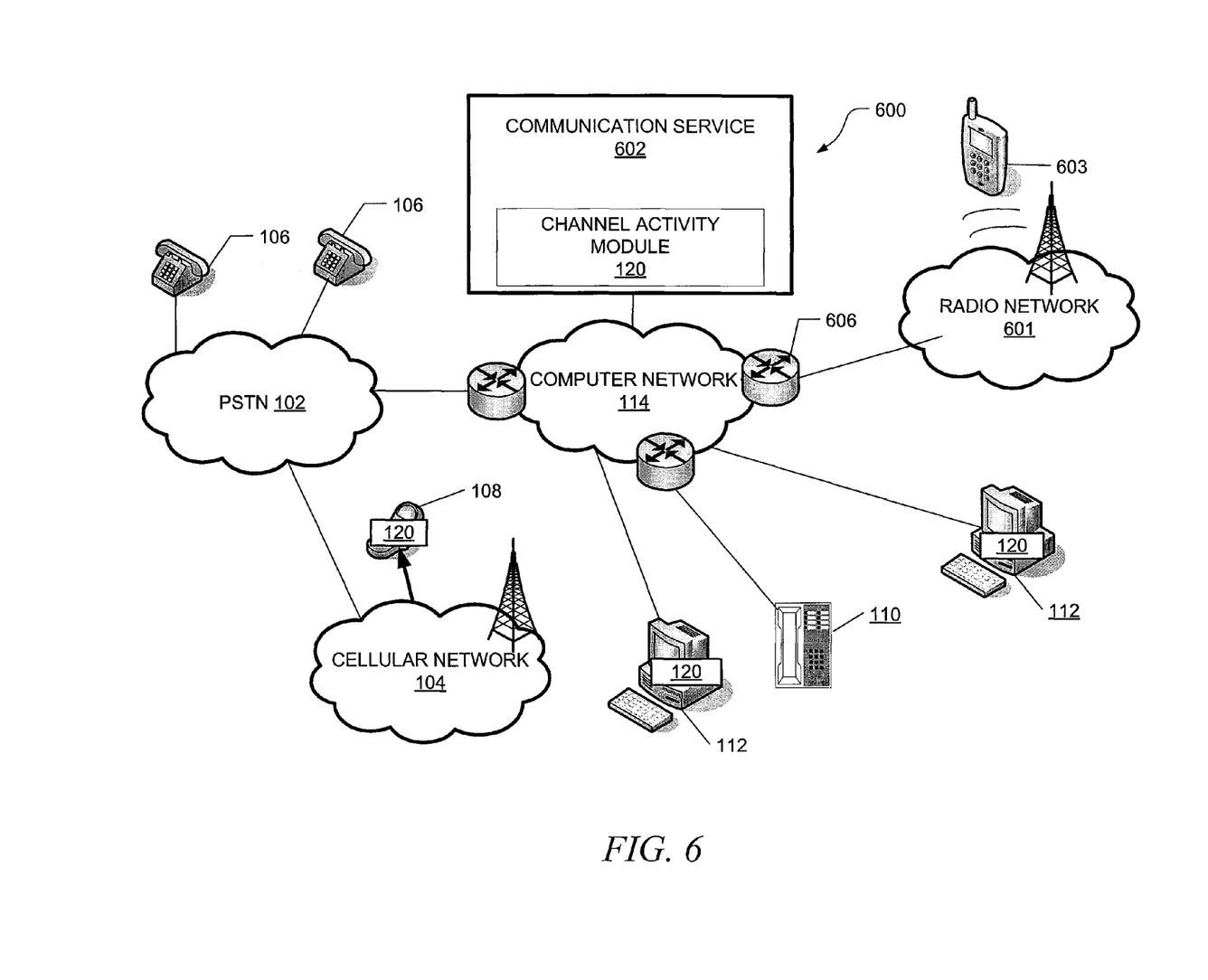
FIG. 6 depicts a simplified diagram of a further communication system, in accordance with an example embodiment.

In an example embodiment, the GUI 500 can be used to associate a first audio identifier with a communication channel (see the method 300) and/or associate a second audio identifier with a command (see the method 400). FIG. 6 depicts a communication system 600, in accordance with an example embodiment, in which the methods 300 and/or 400 may be deployed. The communication system 600 is similar to the communication system 100 and, accordingly, like reference numerals are used to indicate the same or similar features.

The communication system 600 includes a communication service 602 in communication, via the computer network 114, with a PSTN 102, a cellular network 104 and a radio network 601. The networks 114, 102, 104 and 601 facilitate communication between the communication service 602 and the various communication devices 106-112. The communication system 600 further includes a radio network 601 configured to communicate with one or more communication devices 603 (e.g., one or more push-to-talk radios). The communication devices 106-112 and 603 may thus be different types of communication devices such as computers, push-to-talk radios, mobile phones, and other communication devices. The communication service 602 can include a variety of software applications and/or hardware that can monitor and intercept communications between the communication devices 106-112 and 603. The communication service 602 can be hosted on one or more server computers and, as explained in more detail below, may be configured to facilitate communication of media streams on a plurality of communication channels. An example of communication service 602 is the IPICS network (mentioned by way of example above) which facilitates communication interoperability amongst different communication paradigms. A communication paradigm (or a communication modality) includes a mode of communication amongst a collection of interrelated communication devices. The communication paradigm can be distinguished by data format, type of signal, physical link or infrastructure or other communication characteristics. For example, the communication system 600 may facilitate communication between push-to-talk radios 603 (e.g., ultra high frequency (UHF) radio, very high frequency (VHF) radio, and other push-to-talk radios) via the radio network 601 and telephony endpoints (e.g., the telephones 106) of the PSTN 102. In another example embodiment, the communication system 600 can facilitate communication between the push-to-talk radio 603 of the radio network 601 and the VoIP phones 110 or a software client residing on the computer 112. The communication system 600 may control the media and signaling of radio and VoIP systems, resulting in a direct communication between the different communication devices 106-112 (e.g., between the push-to-talk radios and the VoIP phones).

It should be appreciated that radio network 601 may be a collection of communication devices that communicate over radio waves, such as ultra high frequency (UHF) and very high frequency (VHF). The radio network 601 includes, for example, a land-mobile-radio (LMR) network. Examples of communication devices included in radio network 601 include the push-to-talk radio 601 (e.g., UHF radios, VHF radios, and other radio network-based communication devices). It should be noted that push-to-talk radio 603 or other communication devices included in radio network 601 may be push-to-talk radios that operate in half duplex mode, which is in contrast to the communication devices 106 (e.g., POTS phones) that operate in full duplex mode. The radio network 601 may communicate with the computer network 114 by way of a gateway 606, which provides voice and control interoperability between the radio network 601 and the computer network 114 by bridging media and control transmissions to Internet Protocol (IP) multicast and/or Unicast (e.g., Session Initiation Protocol (SIP)) streams.

The communication service 602 (e.g., an IPICS system) is shown to include a channel activity module 120. This channel activity module 120 may, in an example embodiment, implement the method 300 and/or 400.

In the example embodiment shown in FIG. 6, further channel activity monitors may be optionally provided at the communication devices 108-112. When one or more of the communication devices 108-112 includes a channel activity module 120, a media stream transmitted from the device includes an audio identifier associated with a channel that is active as described before herein.

In an example PTT radio deployment, utilizing a trunk radio base station, multiple users may utilize the same base station to communicate with various agencies; each agency may use its own frequency. For example, a first user may use the base station to communicate with a first agency, while a second user may utilize at a different time the same base station to communicate with a second agency. A problem may arise when the second user gains control over the base station and adjusts it to move to a second frequency in order to communicate with the second agency. The first user may get a visual indication that the communication he may hear is no longer coming from the first agency but rather from the second agency (as the second user changed the operating channel of the base station). If the first is user is not watching (or is not able to watch) the visual indicator he may not be aware that the communication frequency has been changed. The systems 100, 600 may provide an audible identifier for all users to ensure that everyone is made aware of the fact that the frequency of the base station has been modified.

In an example embodiment the communications are received over a trunk radio base station associated with multiple endpoints capable to change an operating frequency of the base station. Accordingly, the method 300 may further comprise identifying when a channel change occurs by monitoring when the operating frequency of the base station is changed from a first frequency to a second frequency and include the audio identifier associated with second frequency in the audio stream. The audio stream may then be communicated to all other endpoints associated with the second frequency.

In yet another example embodiment, the communication service 602 is used by a dispatcher or operator to add and remove channels from the VTGs. In accordance with this example embodiment, each time when a channel is either added or removed from a VTG, all of the participants of the VTG are informed via an audible message that a certain channel has been either added or removed from the VTG.

In an example embodiment the plurality of communication channels provide a virtual talk group (VTG). Accordingly, the method 300 may include identifying when a channel change occurs by monitoring when a communication channel is added or removed from the VTG and include the audio identifier associated with an added or removed communication channel in the audio stream. The audio stream may then be communicated to all other endpoints associated with the VTG.

Figure 7:
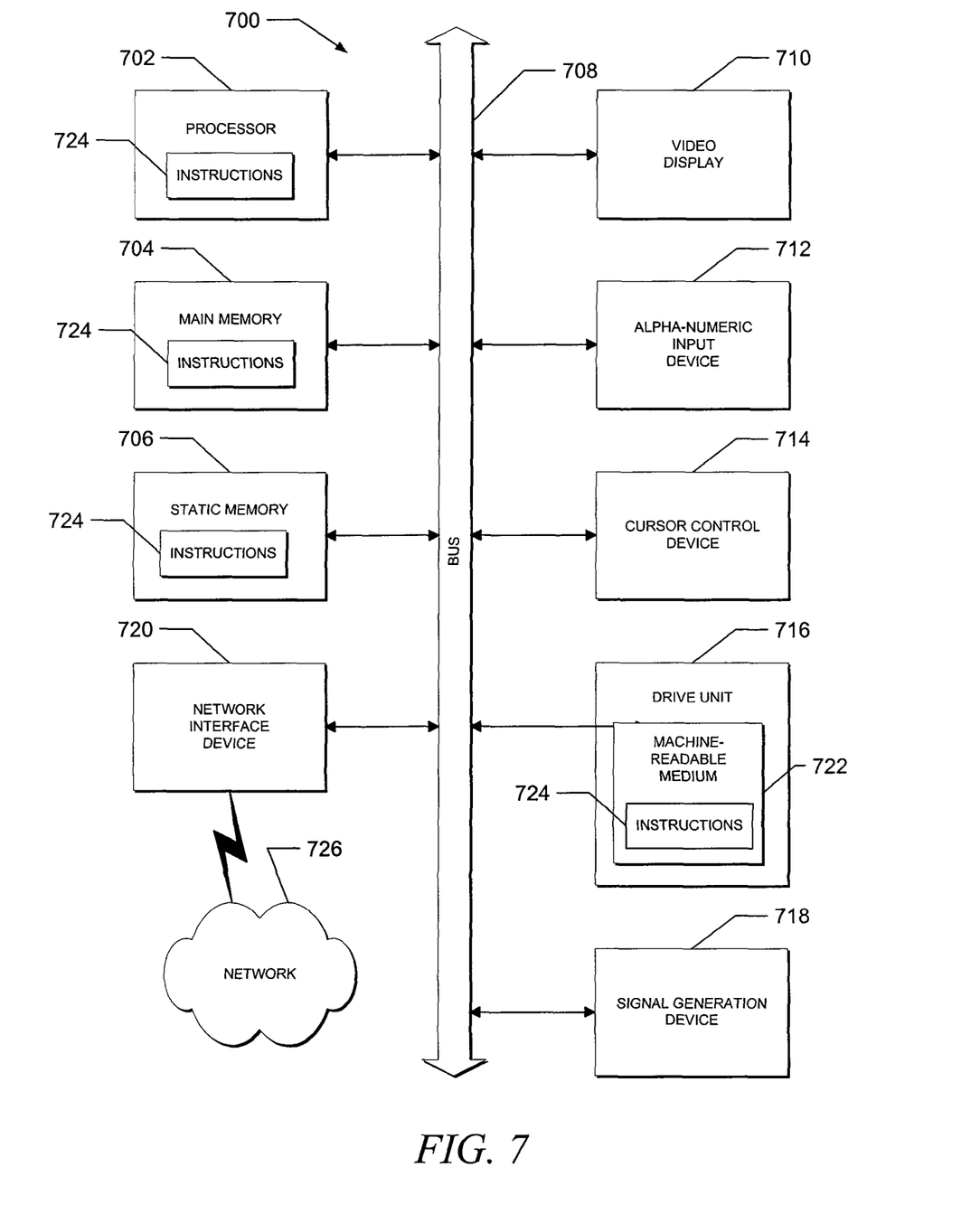
FIG. 7 is a simplified block diagram of a machine in the example form of a computing system within which a set of instructions, for causing the machine to perform any one or more of the methodologies discussed herein, may be executed.

FIG. 7 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 700 includes processor 702 (e.g., a central processing unit (CPU), a graphics processing unit (GPU) or both), main memory 704 and static memory 706, which communicate with each other via bus 708. Computing system 700 may further include video display unit 710 (e.g., a plasma display, a liquid crystal display (LCD) or a cathode ray tube (CRT)). Computing system 700 also includes alphanumeric input device 712 (e.g., a keyboard), user interface (UI) navigation device 714 (e.g., a mouse), disk drive unit 716, signal generation device 718 (e.g., a speaker) and network interface device 720.

Disk drive unit 716 includes machine-readable medium 722 on which is stored one or more sets of instructions and data structures (e.g., software 724) embodying or utilized by any one or more of the methodologies or functions described herein. Software 724 may also reside, completely or at least partially, within main memory 704 and/or within processor 702 during execution thereof by computing system 700, with main memory 704 and processor 702 also constituting machine-readable, tangible media. Software 724 may further be transmitted or received over network 726 via network interface device 720 utilizing any one of a number of well-known transfer protocols (e.g., Hypertext Transfer Protocol (HTTP)).

While machine-readable medium 722 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
    receiving communications on a plurality of communication channels including at least a first communication channel and a second communication channel, a first frequency being associated with the first communication channel and a second frequency being associated with the second communication channel;
    identifying when a channel change occurs from the first communication channel to the second communication channel by monitoring a change in an operating frequency from the first frequency for the first communication channel to the second frequency for the second communication channel; and
    including an audio identifier associated with the second communication channel in an audio stream communicated via the second communication channel.

2. The method of claim 1, wherein the audio identifier is uniquely associated with the second communication channel to identify when the second communication channel is active.

3. The method of claim 1, wherein the plurality of communication channels includes an emergency channel of an emergency dispatch center.

4. The method of claim 1, further comprising:
    providing a user interface identifying the plurality of communication channels and a plurality of audio identifiers;
    receiving a user input, the user input identifying a selected communication channel of the plurality of communication channels and a selected audio identifier of the plurality of audio identifiers; and
    associating the selected audio identifier with the selected communication channel.

5. The method of claim 1, wherein the audio identifier is provided in an audio file, the method further comprising playing at least a portion of the audio file when a transmission occurs on the second communication channel.

6. The method of claim 1, further comprising:
    delaying communicating a voice communication on the second communication channel;
    transmitting the audio identifier; and
    transmitting the voice communication after the audio identifier has been output.

7. The method of claim 1, further comprising:
    mixing the audio identifier with an initial portion of a voice communication to provide a mixed voice communication; and
    transmitting the mixed voice communication.

8. The method of claim 1, wherein
    the plurality of communication channels includes at least two groups of channels, and
    the method further comprises associating the audio identifier with one of the groups of channels to identify when any communication channel in the one group of channels is active.

9. The method of claim 1, wherein the plurality of channels includes at least one virtual talk group in a push-to-talk communication network.

10. The method of claim 1, wherein the audio identifier is a first audio identifier, the method further comprising:
   identifying a command communicated via the second communication channel;
   identifying a second audio identifier associated with the command; and
   communicating the second audio identifier in an audio stream communicated via the second communication channel.

11. The method of claim 10, wherein the command is to enable an electrical device to perform functionality associated with the command.

12. The method of claim 1, wherein the communications are received over a trunk radio base station associated with multiple endpoints, the operating frequency is an operating frequency of the base station, and the multiple endpoints are capable to change the operating frequency of the base station, the method further comprising:
   identifying when a channel change occurs by monitoring when the operating frequency of the base station is changed from the first frequency to the second frequency;
   including the audio identifier associated with second frequency in the audio stream; and
   communicating the audio stream to all other endpoints associated with the second frequency.

13. The method of claim 1, wherein the plurality of communication channels provide a virtual talk group (VTG), the method further comprising:
   identifying when a channel change occurs by monitoring when a communication channel is added or removed from the VTG;
   including the audio identifier associated with an added or removed communication channel in the audio stream; and
   communicating the audio stream to all other endpoints associated with the VTG.

14. The method of claim 1, wherein the audio identifier associated with the second communication channel is included in the audio stream communicated via the second communication channel in response to an identification of an occurrence of the channel change from the first communication channel to the second communication channel.

15. The method of claim 1, wherein the channel change includes a switch from an active first communication channel to an active second communication channel, the audio identifier being uniquely associated with the second communication channel to identify when the second communication channel is active.

16. The method of claim 1, wherein the identification of when the channel change occurs is in response to receiving communications including the operating frequency.

17. The method of claim 1, wherein the audio identifier associated with the second communication channel is included in the audio stream communicated via the second communication channel in response to monitoring the change in the operating frequency from the first frequency to the second frequency.

18. An apparatus, comprising:
   at least one processor; and
   a memory in communication with the at least one processor, the memory being configured to store a channel activity module executable by the at least one processor, and the channel activity module executed by the at least one processor causes operations to be performed, the operations comprising:
      receiving communications on a plurality of communication channels including at least a first communication channel and a second communication channel, a first frequency being associated with the first communication channel and a second frequency being associated with the second communication channel;
      identifying when a channel change occurs from the first communication channel to the second communication channel by monitoring a change in an operating frequency from the first frequency for the first communication channel to the second frequency for the second communication channel; and
      including an audio identifier associated with the second communication channel in an audio stream communicated via the second communication channel.

19. The apparatus of claim 18, wherein the audio identifier is uniquely associated with the second communication channel to identify when the second communication channel is active.

20. The apparatus of claim 18, wherein the plurality of communication channels includes an emergency channel of an emergency dispatch center.

21. The apparatus of claim 18, wherein the operations further comprise:
   providing a user interface identifying the plurality of communication channels and a plurality of audio identifiers;
   receiving a user input, the user input identifying a selected communication channel of the plurality of communication channels and a selected audio identifier of the plurality of audio identifiers; and
   associating the selected audio identifier with the selected communication channel.

22. The apparatus of claim 18, wherein the audio identifier is provided in an audio file, wherein the operations further comprise playing at least a portion of the audio file when a transmission occurs on the second communication channel.

23. The apparatus of claim 18, wherein the operations further comprise:
   delaying communicating a voice communication on the second communication channel;
   transmitting the audio identifier; and
   transmitting the voice communication after the audio identifier has been output.

24. The apparatus of claim 18, wherein the operations further comprise:
   mixing the audio identifier with an initial portion of a voice communication of a communication to provide a mixed voice communication; and
   transmitting the mixed voice communication.

25. The apparatus of claim 18, wherein
   the plurality of communication channels includes at least two groups of channels, and
   the operations further comprise associating the audio identifier with one of the groups of channels to identify when any channel in the one group of channels is active.

26. The apparatus of claim 18, wherein the plurality of channels includes at least one virtual talk group in a push-to-talk communication network.

27. The apparatus of claim 18, wherein the audio identifier is a first audio identifier and the operations further comprise:
   identifying a command communicated via the second communication channel;
   identifying a second audio identifier associated with the command; and transmitting the second audio identifier in an audio stream communicated via the second communication channel.

28. The apparatus of claim 27, wherein the command is to enable an electrical device to perform functionality associated with the command.

29. The apparatus of claim 18, wherein the communications are received over a trunk radio base station associated with multiple endpoints, the operating frequency is an operating frequency of the base station, and the multiple endpoints are capable to change the operating frequency of the base station, the method further comprising:

identifying when a channel change occurs by monitoring when the operating frequency of the base station is changed from the first frequency to the second frequency;

including the audio identifier associated with second frequency in the audio stream; and communicating the audio stream to all other endpoints associated with the second frequency.

30. The apparatus of claim 18, wherein the plurality of communication channels provide a virtual talk group (VTG), the operations further comprising:

identifying when a channel change occurs by monitoring when a communication channel is added or removed from the VTG;

including the audio identifier associated with an added or removed communication channel in the audio stream; and communicating the audio stream to all other endpoints associated with the VTG.

31. An apparatus comprising:

a communications module to receive communications on a plurality of communication channels including at least a first communication channel and a second communication channel, a first frequency being associated with the first communication channel and a second frequency being associated with the second communication channel;

a channel identifier module to identify when a channel change occurs from the first communication channel to the second communication channel by monitoring a change in an operating frequency from the first frequency for the first communication channel to the second frequency for the second communication channel; and means for including an audio identifier associated with the second communication channel in an audio stream communicated via the second communication channel, said means operating responsively to an identification of an occurrence of the channel change from the first communication channel to the second communication channel.

\* \* \* \* \*